T. C. HENRY.
Nut-Lock.
No. 225,128.        Patented Mar. 2, 1880.
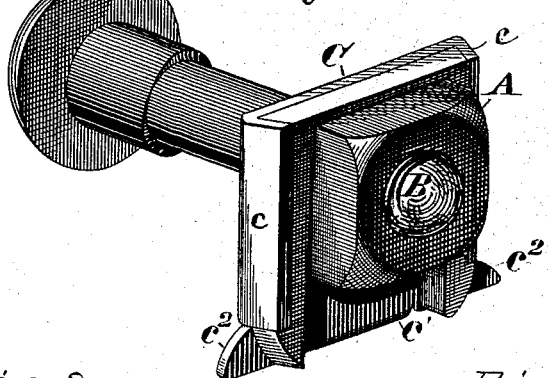
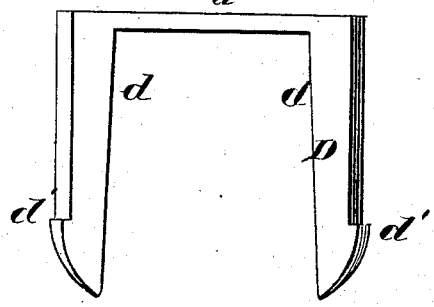
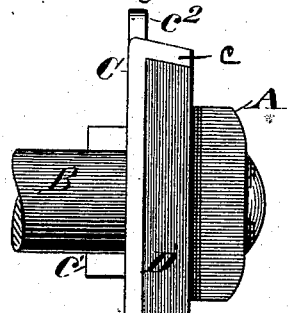
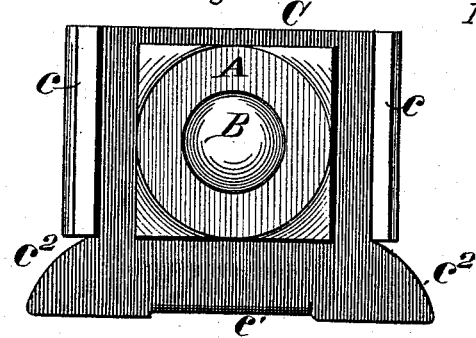
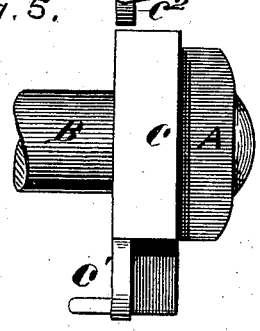
Attest,
Paul Bakewell
Charles Pickles
Inventor.
Thomas C. Henry,
by Chas. D. Moody,
atty.

UNITED STATES PATENT OFFICE.

THOMAS C. HENRY, OF SHELBY COUNTY, ASSIGNOR OF ONE-HALF OF HIS RIGHT TO ANDREW L. CUMMINS, OF MEMPHIS, TENNESSEE.

NUT-LOCK.

SPECIFICATION forming part of Letters Patent No. 225,128, dated March 2, 1880.

Application filed December 1, 1879.

*To all whom it may concern:*

Be it known that I, THOMAS C. HENRY, of Shelby county, Tennessee, have made a new and useful Improvement in Nut-Locks, of which the following is a full, clear, and exact description, reference being had to the annexed drawings, making part of this specification, in which—

Figure 1 is a view, in perspective, of the improvement in position upon a bolt; Fig. 2, a front elevation of the locking-piece; Fig. 3, a front elevation, showing the bolt, nut, and washer; Fig. 4, a top view of the improvement, and Fig. 5 a side view thereof.

The same letters denote the same parts.

The distinguishing feature of this improvement is a U-shaped spring locking-piece, which fits around and locks the nut, being held against the latter by means of flanges or projections that are upon the surface or part against which the nut presses.

The preferable mode of carrying out the invention is shown in the drawings, where A represents a nut, and B a bolt, of the ordinary description. C represents a washer, against which the nut presses. When a washer is not used the part C may represent the surface against which the nut is screwed. It is provided with flanges $c\, c$, which stand out from the face of the washer, a flange, $c'$, extending in the opposite direction from the back of the washer, and the extensions $c^2\, c^2$.

D represents the part used in locking the nut. It is of a springy material, like steel, and is shaped to fit around three sides of the nut, the portions $d\, d$ occupying the spaces between the nut and the flanges $c\, c$, and being provided with hooks $d'\, d'$, which, when the part D is in place upon the nut, engage with the lower ends of the flanges $c\, c$. The latter, and as shown more distinctly in Figs. 1 and 4, incline inward toward the nut, and the portions $d\, d$ are correspondingly beveled.

The nut is locked by placing the lock D in the position shown in Fig. 1, which is effected by springing the hooks $d'\, d'$ sufficiently toward each other to enter between the nut and the flanges $c\, c$, and then pressing the lock down until the hooks pass the lower ends of the flanges, whereupon the hooks spring outward and become hooked around the flanges.

The nut is unlocked by first springing the parts $d\, d$ inward sufficiently for the hooks $d'\, d'$ to clear the flanges $c\, c$, and then drawing the lock out from between the nut and flanges.

The flange $c'$ serves, when the part C is a washer, to keep the latter from turning, the flange fitting against the side of the part— say a fish-bar—against which the washer is placed.

The extensions $c^2\, c^2$ may serve as guards to prevent the hooks $d'\, d'$ from being accidentally struck and dislodged from their bearings.

I claim—

1. The combination, with the nut A, bolt B, and washer C, having the flanges $c\, c$, of the spring-lock D, having the hooks $d'\, d'$, substantially as described.

2. The combination of the nut A, bolt B, washer C, flanges $c\, c$, inclined as described, and the parts $d\, d$, united by the part $d^2$, substantially as described.

3. The combination of the nut A, bolt B, washer C, having the flanges $c\, c$ and $c'$, and the spring-lock D, substantially as described.

4. The combination of the washer C, having the flanges $c\, c$ and extensions $c^2\, c^2$, and the spring-lock D, having the hooks $d'\, d'$, substantially as described.

THOMAS C. HENRY.

Witnesses:
F. M. TUBBS,
L. H. TEERSEN.